United States Patent
Yamaguchi et al.

(10) Patent No.: US 6,998,742 B2
(45) Date of Patent: Feb. 14, 2006

(54) AXIAL-AIR-GAP BRUSHLESS VIBRATION MOTOR CONTAINING DRIVE CIRCUIT

(75) Inventors: Tadao Yamaguchi, Isesaki (JP); Tetushi Yashima, Isesaki (JP); Masahiro Takagi, Isesaki (JP); Satoru Shimosegawa, Isesaki (JP); Kentaro Fujii, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 39 days.

(21) Appl. No.: 10/695,617

(22) Filed: Oct. 27, 2003

(65) Prior Publication Data

US 2004/0084980 A1 May 6, 2004

(30) Foreign Application Priority Data

| Oct. 28, 2002 | (JP) | ............................. 2002-312144 |
| May 29, 2003 | (JP) | ............................. 2003-151863 |
| Jul. 4, 2003 | (JP) | ............................. 2003-270866 |
| Sep. 17, 2003 | (JP) | ............................. 2003-323998 |

(51) Int. Cl.
H02K 7/06 (2006.01)

(52) U.S. Cl. .............. 310/81; 310/156.26; 310/268
(58) Field of Classification Search ............ 310/81, 310/156.32, 156.26, 266, 268
See application file for complete search history.

(56) References Cited

U.S. PATENT DOCUMENTS

| 4,626,727 | A | * | 12/1986 | Janson ............... 310/156.32 |
| 5,027,025 | A | * | 6/1991 | Saneshige et al. ..... 310/156.38 |
| 5,245,235 | A | * | 9/1993 | Nagai et al. ............ 310/67 R |
| 5,252,871 | A | * | 10/1993 | Inoue ..................... 310/90 |
| 6,274,955 | B1 | * | 8/2001 | Satoh et al. .............. 310/71 |
| 2004/0104631 | A1 | * | 6/2004 | Noguchi .................. 310/81 |
| 2004/0130226 | A1 | * | 7/2004 | Yoshida et al. ............ 310/81 |
| 2004/0135444 | A1 | * | 7/2004 | Choi et al. ............... 310/81 |

FOREIGN PATENT DOCUMENTS

| JP | 3-159202 | 7/1991 |
| JP | 4-137463 | 5/1992 |
| JP | 7-75318 | 3/1995 |
| JP | 7-170682 | 7/1995 |
| JP | 8-154356 | 6/1996 |
| JP | 8-256449 | 10/1996 |
| JP | 9-37511 | 2/1997 |
| JP | 9-154250 | 6/1997 |
| JP | 11-8951 | 1/1999 |
| JP | 11-098761 | 4/1999 |
| JP | 2000-60054 | 2/2000 |
| JP | 2000-82252 | 3/2000 |
| JP | 2000-245103 | 9/2000 |
| JP | 2000-262969 | 9/2000 |
| JP | 2001-78407 | 3/2001 |
| JP | 2001-232290 | 8/2001 |
| JP | 2001-286089 | 10/2001 |
| JP | 2001-339915 | 12/2001 |
| JP | 2002-142427 | 5/2002 |
| JP | 2002-143767 | 5/2002 |
| JP | 2002-143768 | 5/2002 |
| JP | 2003-62526 | 3/2003 |
| JP | 2003-088805 | 3/2003 |
| JP | 2003-180050 | 6/2003 |
| JP | 2003-180062 | 6/2003 |

* cited by examiner

Primary Examiner—Dang Le
(74) Attorney, Agent, or Firm—Jordan and Hamburg LLP

(57) ABSTRACT

An axial-air-gap brushless vibration motor has an eccentric rotor R in which an axial-air-gap magnet and an arched weight are provided in a rotor yoke which is rotatably mounted on a shaft fixed to a yoke bracket. A stator base is attached to the yoke bracket which includes a magnetic portion receiving the magnetic field of the magnet and a nonmagnetic portion. One Hall sensor and a drive circuit member for receiving output of the Hall sensor are disposed so that they do not overlap on a radial plane, of the stator base which has single-phase air-core armature coils installed. A cover member is welded to the yoke bracket.

15 Claims, 10 Drawing Sheets

AXIAL-AIR-GAP BRUSHLESS VIBRATION MOTOR CONTAINING DRIVE CIRCUIT

BACKGROUND OF THE INVENTION

1. Field of the Invention

The present invention relates to an axial-air-gap brushless vibration motor suitable for silent information means for mobile communication devices, in particular, to an axial-air-gap brushless vibration motor containing a drive circuit.

2. Description of the Related Art

The Applicant has previously suggested a flat axial-air-gap brushless vibration motor of a coreless and slotless type, this motor containing no drive circuit component (Japanese Utility Model Application Laid-open No. H4-137463 and Japanese Patent Application Laid-open No. 2002-143767).

A cored motor of a non-circular configuration in which armature coils are wound on a plurality of equidistantly disposed protruding poles and a drive circuit component is disposed on a side of a stator is known as a brushless vibration motor equipped with a drive circuit (Japanese Patent Application Laid-open No. 2000-245103).

However, a width of such a motor is increased and the motor exhibits poor mounting efficiency in mounting by an SMD method on a printed wiring board. Moreover, because of the cored configuration, a thickness of the motor is unavoidably large and the motor has poor utility.

Accordingly, the Applicant has previously suggested a vibration motor, including cored and slotless-coreless types, in which some of a plurality of armature coils were removed to provide an empty space in which a drive circuit member was disposed (Japanese Patent Application Laid-open No. 2002-142427, FIGS. 8 through 11).

SUMMARY OF THE INVENTION

It is an object of the present invention to provide a very thin axial-air-gap brushless motor which is further improved over an axial-air-gap brushless vibration motor shown in FIGS. 8 through 11 of Japanese Patent Application Laid-open No. 2002-142427, has a thin simple structure consisting of a small number of parts, can incorporate one Hall sensor and a drive circuit member actuated by the output of the sensor for appropriate generation of a detent torque and a reliable start, can be handled as a usual DC motor, and has a sufficient strength despite a decreased thickness of components.

In order to attain this object, the present invention provides an axial-air-gap brushless vibration motor composed of an eccentric rotor comprising a rotor yoke, an axial-air-gap magnet having a plurality of magnetic poles disposed at the rotor yoke, and an eccentric weight from a tungsten alloy disposed at the rotor yoke in a radial direction outwardly of the magnet; a stator comprising a shaft supporting the eccentric rotor, a yoke bracket having disposed in the center thereof a shaft support portion for supporting the shaft, a stator base attached as an auxiliary element to the yoke bracket and having a feed terminal portion in the radial direction, two single-phase wiring-type air-core armature coils disposed in the stator base, one Hall sensor and a drive circuit member for receiving the output of the Hall sensor which are disposed in the stator base so as to overlap none of the air-core armatures, when seen from the plan view; and a cover member for covering those components, wherein on a portion of the stator there are a magnetic portion receiving the magnetic field of the axial-air-gap magnet and a non-magnetic portion, and in the yoke bracket, the above-mentioned one Hall sensor is positioned in part of the magnetic portion, the drive circuit member is positioned in the nonmagnetic portion, when seen from the plan view, and the opening of the cover is incorporated in the outer peripheral portion.

More specifically, in a preferred configuration, the magnetic portion is composed of a central portion and a plurality of detent torque generation portions extending in the radial direction from the central portion integrally therewith, and a holding portion enclosing the detent torque generation portions, the non-magnetic portion is a hollow portion between the detent torque generation portions, the base end of the shaft is fixed to a shaft support portion equipped with a reinforcing member and disposed in the center of the yoke bracket, at least the air-core armature coils are disposed in the stator base by using a resin, so that the upper surface of the air-core armature coils is exposed inside the gap, the rotor is mounted rotatably on the shaft via a bearing which is disposed in the rotor yoke, and the distal end of the shaft is fit into the recess in the center of the cover member.

In another specific configuration, there is a yoke portion consisting of a magnetic sheet with a thickness of no more than 0.1 mm, serving as the magnetic portion; and pasted thereto is a bracket portion consisting of a nonmagnetic sheet with a thickness of no more than 0.1 mm, serving as the nonmagnetic portion; the yoke portion has a central portion, a plurality of detent torque generation portions extending in the radial direction from the central portion integrally therewith, and a holding portion enclosing the detent torque generation portions; the first end portion of the shaft is fixed to a shaft support portion equipped with a reinforcing member and disposed in the center of the yoke bracket, at least the shaft support portion and the air-core armature coils are integrated with the stator base with an adhesive resin, so as to prevent gap portion protrusion; the rotor is mounted rotatably on the shaft via a bearing which is disposed in the rotor yoke; and the second end portion of the shaft is fit into the recess in the center of the cover member.

In a preferred fixed shaft configuration, the first end portion of said shaft is welded to the shaft support portion, and the second end portion is welded to the cover.

Further, in a preferred rotary shaft configuration, the first end portion of the shaft is welded to the rotary yoke, a bearing rotatably supporting the shaft is disposed in the shaft support portion, and the second end portion of the shaft is pivotally supported on the stator base side.

In the specific configuration of the detent torque generation portions, a total of three of the detent torque generation portions are formed, at least one of the portions has a width substantially equal to that of a neutral zone of the magnetic pole of the axial-air-gap magnet which is to be assembled, and the opening angle of at least one portion may be almost equal to a two-fold angle of the magnetic pole of the axial-air-gap magnet.

In yet another specific configuration, the magnetic portion is formed by printing onto the nonmagnetic portion, or the magnetic portion is magnetically plated onto the nonmagnetic portion.

Specific configurations of the eccentric rotor of a fixed shaft type are as described herein. In the eccentric rotor, the rotor yoke comprises a flat portion serving as a return pass of the magnet, an axially extending portion on the outer diameter side, and an inner diameter portion for supporting the shaft, and the shaft is supported via a metal member provided on the inner diameter side of the axial-air-gap magnet, tongues protrude outwardly in the radial direction from the axially extending portion on the outer diameter side and integrally therewith, a flange protrudes inwardly in the radial direction from the axially extending portion on the inner diameter side, recesses for fitting the tongues are formed on the eccentric weight with a specific gravity of 15 or more, the eccentric weight is attached by fitting the tongues into the recesses, and the shaft is supported on the bearing by using the flange.

In a preferred configuration of the eccentric rotor of a rotary shaft type, a separate metal member is fixedly attached to the rotor yoke on the inner diameter side of the axial-air-gap magnet, and the shaft is supported via this metal member.

With the invention described above, the drive circuit member can be easily incorporated, two (positive and negative) feed terminals can be employed, and the magnet can be stopped in the prescribed position by using the nonmagnetic portion and magnetic portion of the yoke bracket, thereby providing for a reliable start and making it possible to decrease the thickness.

With the invention as further described above, the upper surface of the air-core armature coils is exposed inside the gap. Therefore, there is no risk of loosing the gap magnetic flux density. Because the yoke bracket can be provided as a single member, the number of parts is not increased.

With the invention as still further described above, the detent torque can be obtained with a magnetic yoke sheet and a sufficient strength of the yoke bracket can be obtained by combining the magnetic yoke sheet and a nonmagnetic bracket sheet. Furthermore, because the resin can be prevented from leaking from the bottom surface with the bracket sheet, a resin composed of a UV-curable adhesive can be used for fixing the air-core armature coils. Further, because the first end portion of the shaft is held with the cover member, impact resistance is increased.

With the invention as further elaborated upon above, because the shaft is stopped by the cover even when the shaft is subjected to axial impacts, a small-diameter shaft can be employed. Moreover, because both the yoke bracket and the rotor yoke are thin, a thin motor configuration can be obtained.

With the invention as still further elaborated upon above, because one end portion of the shaft is pivotally supported in the rotary shaft configuration, sliding loss can be reduced.

With the invention as further elaborated upon above, the neutral zone of the magnet poles does not reach above the detent torque generation members, and the position of the magnetic poles can be easily detected with the Hall sensor.

With the inventions yet further described above, detent torque generation portions, which constitute a magnetic portion, can be extremely thin, allowing the bracket plate, which is part of the nonmagnetic portion, to be that much thicker, specifically, as thick as 0.1 mm, thus ensuring sufficient strength; even in cases where the stator base, which is another part of the nonmagnetic portion, is subject to application of a magnetic coating or to magnetic plating, the resulting thickness of the magnetic portion can essentially be ignored.

With the inventions yet further described above, the weight and the magnet can be held reliably as the eccentric rotor in a fixed shaft configuration, and the fixing strength of the shaft can be increased by using a metal member in a fixed shaft or rotary shaft configuration.

DESCRIPTION OF THE PREFERRED EMBODIMENTS

There are provided a yoke bracket having disposed in the center thereof a shaft support portion for supporting a shaft, a stator base attached as an auxiliary element to the yoke bracket and having a feed terminal portion in a radial direction, two single-phase wiring-type air-core armature coils disposed in the stator base, one Hall sensor and a drive circuit member for receiving the output of the Hall sensor which are disposed in the stator base so as to overlap none of the air-core armature coils, when seen from the plan view, and a cover member for covering those components, wherein the yoke bracket comprises a magnetic portion receiving a magnetic field of the axial-air-gap magnet and a non-magnetic portion, and in the yoke bracket, the above-mentioned one Hall sensor is positioned in part of the magnetic portion and the drive circuit member is positioned in the nonmagnetic portion, when seen from the plan view, and an opening of the cover is incorporated in an outer peripheral portion.

Embodiment 1

Figure 1:
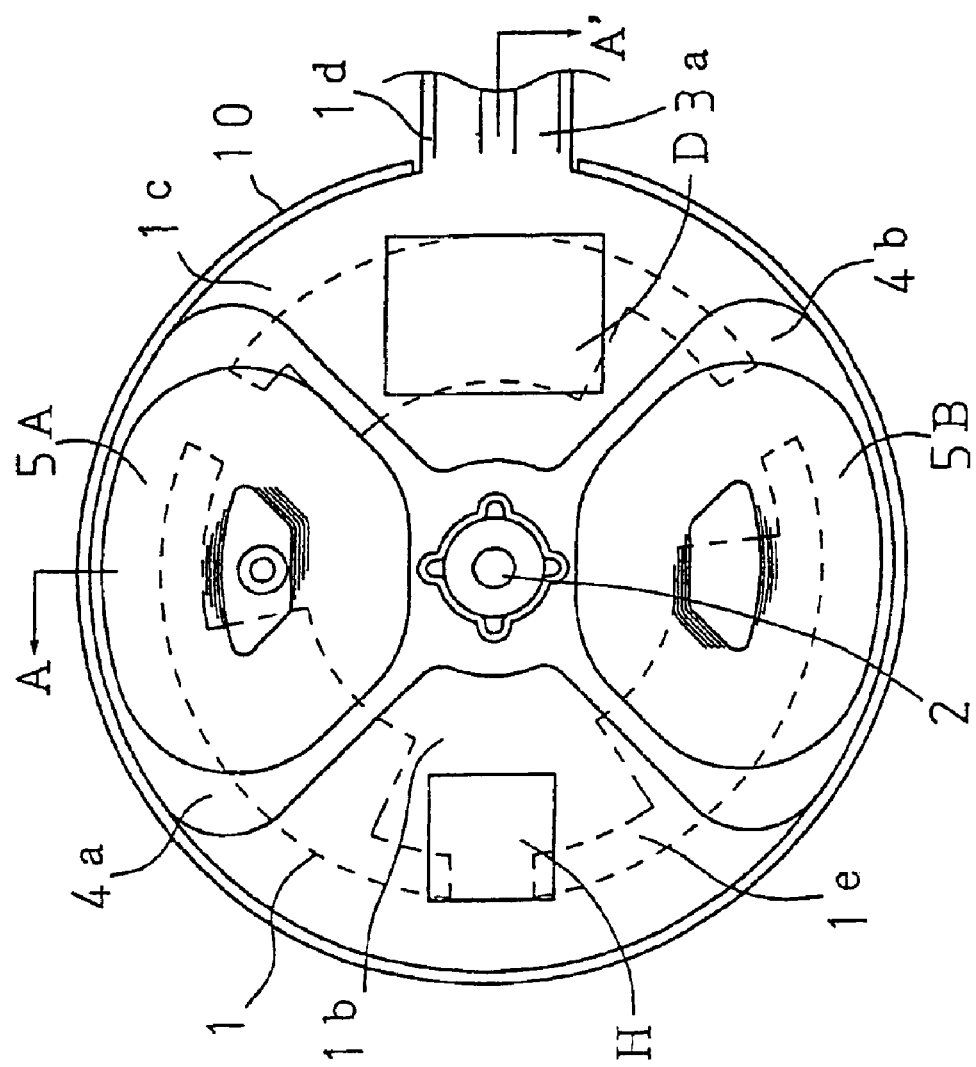
FIG. 1 illustrates a first embodiment of the present invention, this figure being a plan view of a lateral section of an axial-air-gap brushless vibration motor of a coreless slotless system and a fixed shaft type (Embodiment 1)
Figure 2:
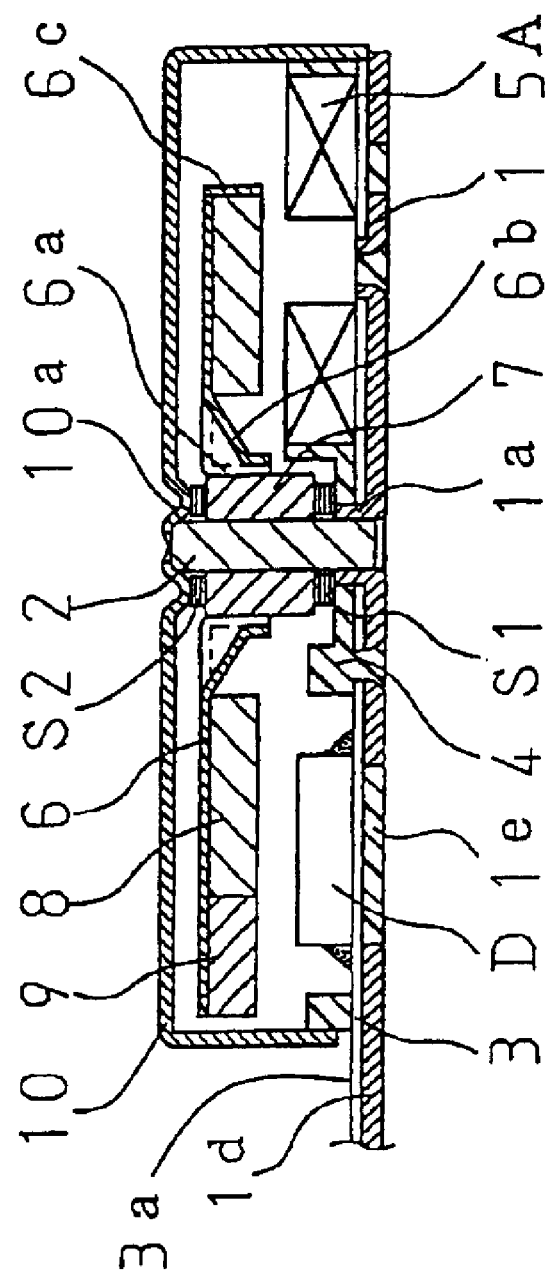
FIG. 2 is a longitudinal sectional view along the A—A section in FIG. 1.

An axial-air-gap brushless vibration motor of a coreless slotless system and a fixed shaft type in accordance with the present invention is shown in FIG. 1 and FIG. 2.

A yoke bracket 1 is composed of a thin stainless steel sheet with magnetic properties weaker that those of an iron sheet and a thickness of about 0.15 mm and has a shaft support portion 1a in the form of a ring in a center thereof and three detent torque generation portions 1b provided so as to extend with an angular spacing of about 120 degrees in the radial direction, as shown by a broken line in the figures.

Furthermore, in the yoke bracket 1, the detent torque generation portions 1b partially extend in the radial direction and a ring-shaped holding portion 1c also serving as a reinforcement is provided so as to close the three detent torque generation portions 1b.

Part of this holding portion 1c further protrudes in the radial direction and serves as a power feed terminal installation portion 1d.

The yoke bracket 1 is provided to stop the magnetic pole of the below-described axial-field magnet, and openings 1e are formed as nonmagnetic portions between the detent torque generation portions 1b.

On an upper surface of the yoke bracket 1 having the above-described configuration, a thin shaft 2 with a diameter of 0.5–0.6 mm is inserted under pressure by the base end (first end portion) thereof into the shaft support portion 1a, and a stator base 3 composed of a flexible printed circuit board or a glass cloth epoxy substrate is installed about a circumference of the shaft.

Furthermore, the above-mentioned yoke bracket 1 is integrated with a liquid-crystalline heat-resistant resin 4 resistant to reflow soldering, such as polyethylene sulfide, so as to serve as a frame. This heat-resistant resin 4 is formed so as to have an almost 8-like shape and to serve as guides 4a, 4b of air-core armature coils 5a, 5b on the stator base 3.

On an outer periphery of the stator base 3, a portion thereof protrudes from the outer periphery as a feed terminal portion 3a and overlaps the power feed terminal installation portion 1d.

In the stator base 3, two air-core armature coils 5a, 5b are installed opposite each other and connected in series so as to obtain a single-phase configuration.

On the stator base 3 between those air-core armature coils 5a, 5b, one Hall sensor H and a drive circuit member D with an IC configuration are disposed so as to face each other across the shaft 2 in the portion where no heat-resistant resin 4 was formed. The upper surface of the air-core armature coils is exposed so that resin or the like does not protrude into the air gap portion. Here, a minimum air gap is bounded by the upper surface of the air-core armature coils 5a, 5b and a bottom surface of the below-described axial-air-gap magnet which is to be assembled.

The yoke bracket 1, air-core armature coils 5a, 5b, Hall sensor H, drive circuit member D, and stator base 3 constitute a stator member that constitutes the stator.

Relative positions of the detent torque generation portion 1b and the single-phase air-core armature coils 5a, 5b are set so that the effective conductor portions of the air-core armature coils 5a, 5b match the magnetic pole of the below-described magnet, and the shape of the detent torque generation portions 1b is set so that a minimum stopping torque is obtained when the stop is caused by the magnetic force of the magnet.

Those air-core armature coils 5a, 5b, Hall sensor H and drive circuit member D serving as stator components are disposed so that they do not overlap each other, when seen from the plan view, and can be in the form of thin members.

In the configuration shown herein, portions of the heat-resistant resin 4 are raised as guides 4a, 4b, and the air-core armature coils 5a, 5b are installed on the stator base 3 by using those guides 4a, 4b. However, the above-mentioned stator members may be molded integrally with the heat-resistant resin. Furthermore, the air-core armature coils 5a, 5b may be also fixed with a UV-curable adhesive, instead of the above-mentioned heat-resistant resin 4.

On the other hand, an eccentric rotor R rotatably mounted on the shaft 2 and to be paired with the stator is composed of a rotor yoke 6 formed of a thin magnetic sheet with a thickness of about 0.1 mm, an axial-air-gap magnet 8 adhesively bonded to the surface of the rotor yoke 6 on the stator side, an arched weight 9 welded, for example, by laser welding to the rotor yoke 6 on the outer periphery of the magnet 8, and a sintered oil-impregnated bearing 7 which is press fit into the bearing support portion 6a in the form of a bar ring, which is provided in the center of the rotor yoke 6.

Here, in the rotor yoke 6, reinforcing ribs 6b are formed radially from the shaft support portion 6a by using dead space in the thickness direction in order to prevent deformation at the time of an impact caused, for example, by a fall. In the figures, the reference symbol 6c stands for a tongue axially extending down for reinforcement at the time of adhesive bonding and employed for positioning the magnet 8, this tongue being disposed opposite the arched weight. The magnet 8 is six-pole magnetized and because the driving principle thereof is well known, explanation thereof is omitted.

The eccentric rotor R is rotatably mounted on the shaft 2 in a state in which at least two stacked thrust washers S1 are mounted between the sintered oil-impregnated bearing 7 and the stator in order to reduce brake loss. A cover member 10 consisting of a thin nonmagnetic stainless steel material is then covered, and the distal end of the shaft 2 is fit into the bar ring hole 10a formed in the center of the cover member 10. At this time, at least two thrust washers S2 are mounted between the sintered oil-impregnated bearing 7 and the cover member 10.

Here, the diameter of the bar ring hole 10a is less than the diameter of the shaft 2 and the distal end of the shaft 2 does not protrude from the hole. The distal end portion is laser welded to the above-mentioned cover member 10 to prevent deformation. The open portion of the cover member is assembled by laser welding with the holding portion 1c of the yoke bracket 1.

Therefore, because assembling is thus conducted by welding, even though the shaft has a small diameter, it has high resistance against impacts in the radial direction. Moreover, though a thin cover member is used, a sufficient strength can be obtained.

Embodiment 2

Figure 3:
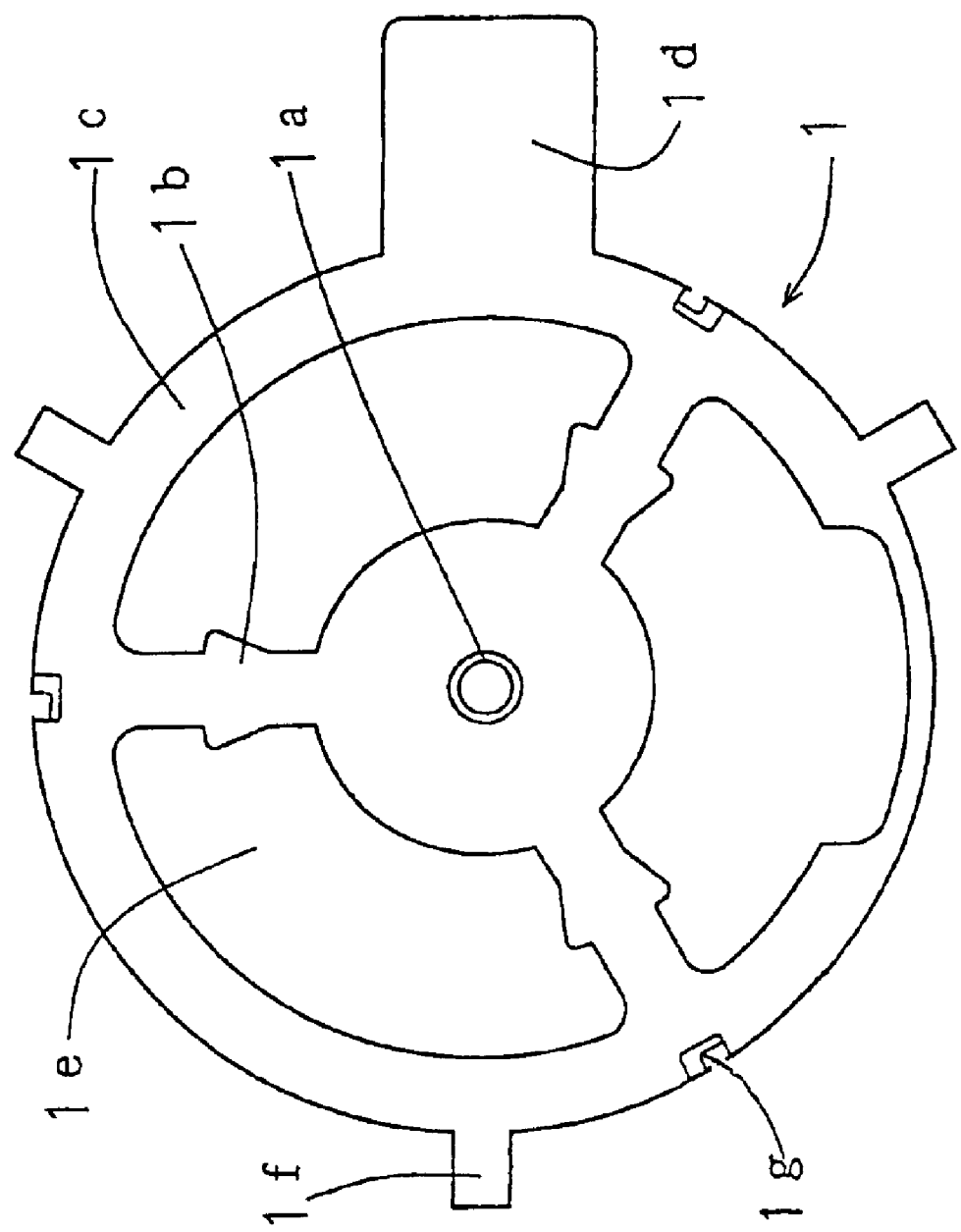
FIG. 3 is a plan view of a modification example of a stator member (Embodiment 2)

A configuration representing a modification example of the yoke bracket as a stator member will be described below with reference to FIG. 3.

Components identical to those of the above-described embodiment or almost identical components having the same function as those of the above-described embodiment will be assigned hereinbelow with the same symbols and the explanation thereof will be omitted.

Thus, a specific feature of the yoke bracket 1 of this embodiment, which differentiates it from the yoke bracket of Embodiment 1, is that the width of the detent torque generation portions 1b is almost equal to that of the neutral zone of the magnetic pole of the below-described axial-air-gap magnet which is to be assembled.

Here, the shaft support portion 1a is formed to have a diameter less than the inner diameter of the magnet 8 which is to be assembled, and the inner diameter of the holding portion 1c is larger than the outer diameter of magnet 8. With such a configuration, the axial-air-gap magnet is not magnetically attached to the shaft support portion 1a and holding portion 1c. Therefore, when the rotation of the rotor R is stopped by current interruption, the centers of the magnetic poles actually stop above the detent torque generation portions 1b.

In the figure, the reference symbol 1f stands for a leg portion for attaching, which projects further outwardly from the holding portion 1c, thereby allowing for direct reflow soldering, for example, to the printed wiring board of an apparatus. Furthermore, the reference symbol 1g stands for a protrusion for defining the position of the stator base and preventing the detachment of the yoke bracket 1 and resin 4 at the time of integral molding from the resin.

In the yoke bracket 1 of the above-described configuration, other stator components, in particular, including the contour of air-core armature coils, are integrally formed from the resin 4. Therefore, even though the yoke bracket 1 is thin, the integrated components serve as a frame. As a result, the combined effect thereof increases the strength, and the entire stator can be reinforced.

Embodiment 3

Figure 4:
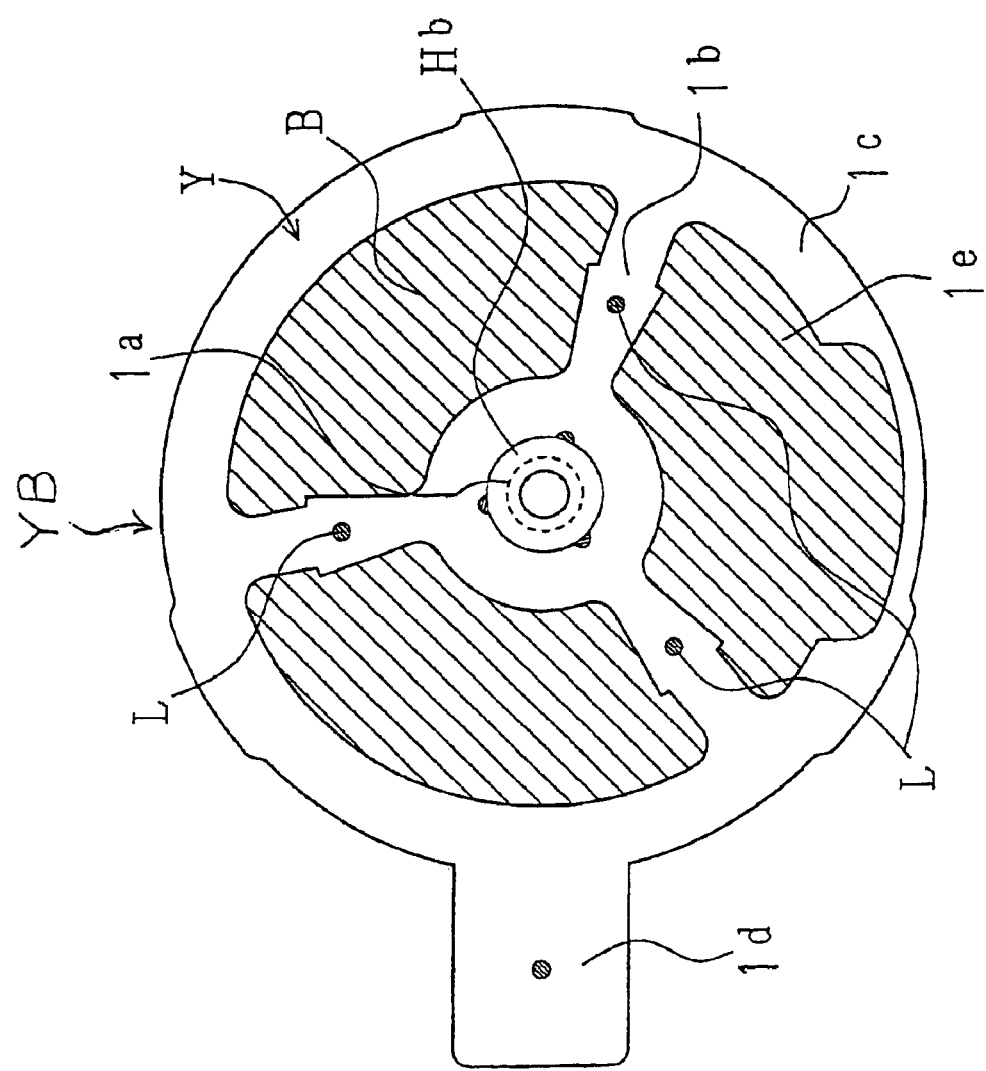
FIG. 4 is a plan view illustrating another embodiment of main components in accordance with the present invention (Embodiment 3)
Figure 5:
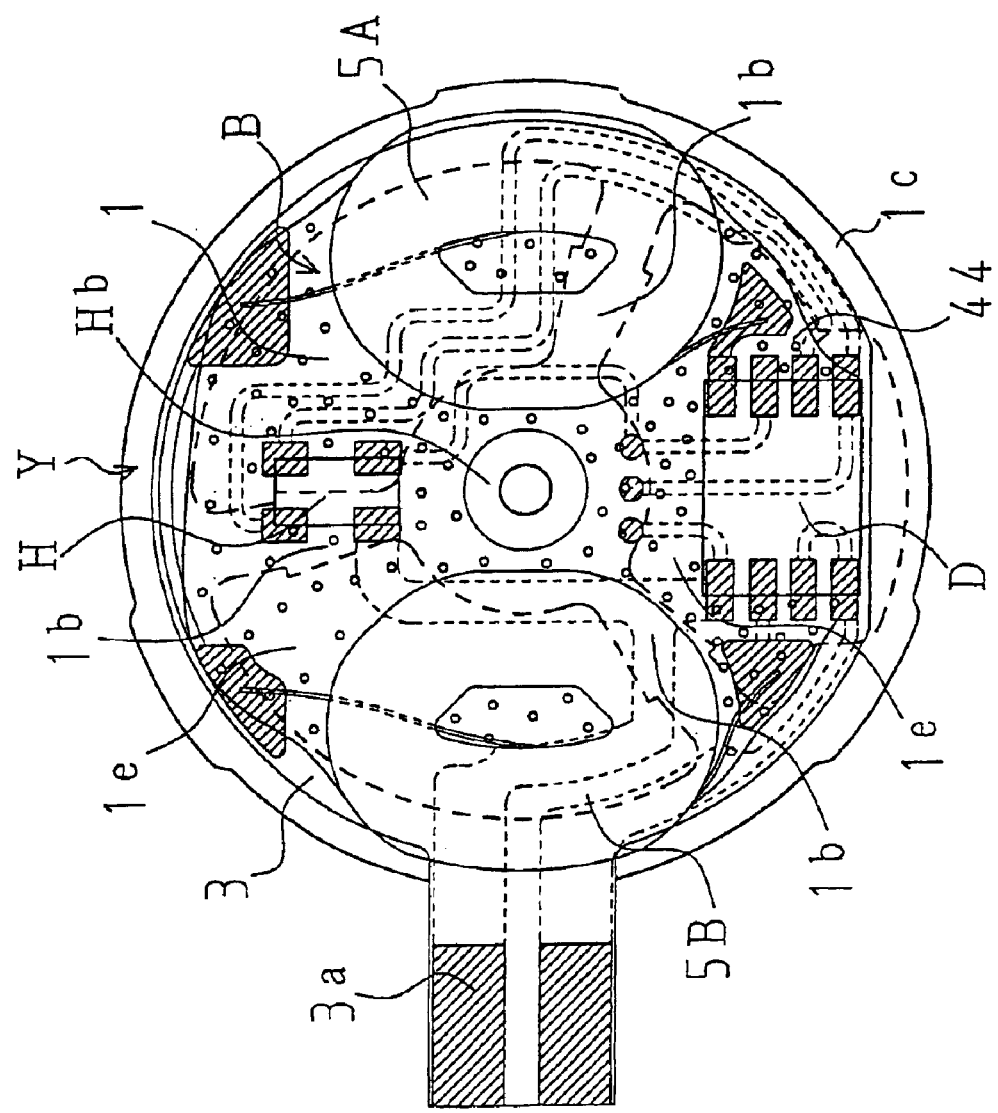
FIG. 5 is a plan view of the stator comprising the same members.

FIG. 4 illustrates another embodiment of the yoke bracket. FIG. 5 illustrates the configuration of a stator equipped with this yoke bracket. Here, too, the components identical to those of the above-described embodiments, are assigned with the same reference symbols and explanation thereof is omitted.

The yoke bracket YB comprises a yoke sheet Y composed of a thin sheet of a magnetic stainless steel or Permalloy with a thickness of 0.05 mm to 0.1 mm, and a bracket sheet B made from a nonmagnetic stainless steel or an elastic copper-nickel alloy attached, for example, by multiple spot welding L to the yoke sheet Y.

In the center of the bracket sheet B, the shaft support portion 1a is raised in the form of a bar ring, and a cylindrical reinforcing member Hb fabricated from a free-cutting bronze is press fitted therein so as to hold down the bar ring portion of the shaft support portion 1a.

The bracket sheet B is formed so that the contour thereof almost matches that of the yoke sheet Y, and part of the contour further protrudes in the radial direction, thereby forming the power feed terminal installation portion 1d.

The width of the three detent torque generation portions 1b almost matches that of the neutral zone of the axial-air-gap magnet which is to be assembled. Therefore, between the detent torque generation portions 1b, the above-described bracket sheet B is exposed in the rotor direction through the nonmagnetic hollow portions.

A thin shaft 2 with a diameter of 0.5–0.6 mm is inserted under pressure by the base end thereof into the shaft support portion 1a of the yoke bracket YB having the above-described configuration. A stator base 3 composed of a flexible printed circuit board is installed on the circumference of the shaft, and part thereof is provided in the power feed terminal installation portion 1d as the feed terminal portion 3a.

In the stator base 3, two air-core armature coils 5A, 5B are installed opposite each other and connected in series so as to obtain a single-phase configuration.

Between those air-core armature coils 5A, 5B, one Hall sensor H and a drive circuit member D with an IC configuration are disposed so as to face each other via the center. Here, the Hall sensor H is set so as to be positioned on the detent torque generation portion 1b, and the drive circuit member D is set so as to be positioned in the hollow portion 1e, when seen from the plan view.

In this embodiment, too, the relative positions of the detent torque generation portions and the single-phase air-core armature coils are set so that the effective conductor portions of the air-core armature coils match the magnetic poles of the below-described magnet, and the shape of the detent torque generation portions 1b may be set so that a minimum stopping torque is obtained when the stop is caused by the magnetic force of the magnet.

The stator components, i.e., the two air-core armature coils 5A, 5B, Hall sensor H, and drive circuit member D, are fixed, in the order of description, from the periphery of the reinforcing member Hb to the stator base 3 with a UV-curable adhesive 44.

Here, the reinforcement with the UV-curable adhesive 44 is necessary at least on the periphery of the reinforcing member Hb and part of the air-core armature coils 5A, 5B. The quantity of the adhesive poured into the gap portion formed with the opposing rotor is obviously controlled so as to prevent oozing of the adhesive onto the member determining the minimum gap (here, the air-core armature coils).

The periphery of the reinforcing member Hb is welded to the yoke sheet by laser welding. The stator components are provided to that they do not overlap when seen from the plan view and can have a thin configuration. The impact resistance is improved by the UV-curable adhesive 44.

As a modification of the present embodiment, the above-mentioned reinforcing member may be formed as a simple sleeve (not shown in the figure), and the yoke bracket produced by combining the yoke sheet 1a and the bracket sheet 1b together and forming into a bar ring may be inserted under the pressure into the contour portion thereof. In such a case, the contour of the reinforcing member increases with respect to that of the shaft, thereby providing for resistance to insertion under pressure. Furthermore, part of the outer periphery of the reinforcing member and the bar ring end of the yoke bracket may be fixed by laser welding.

Embodiment 4

Figure 6:
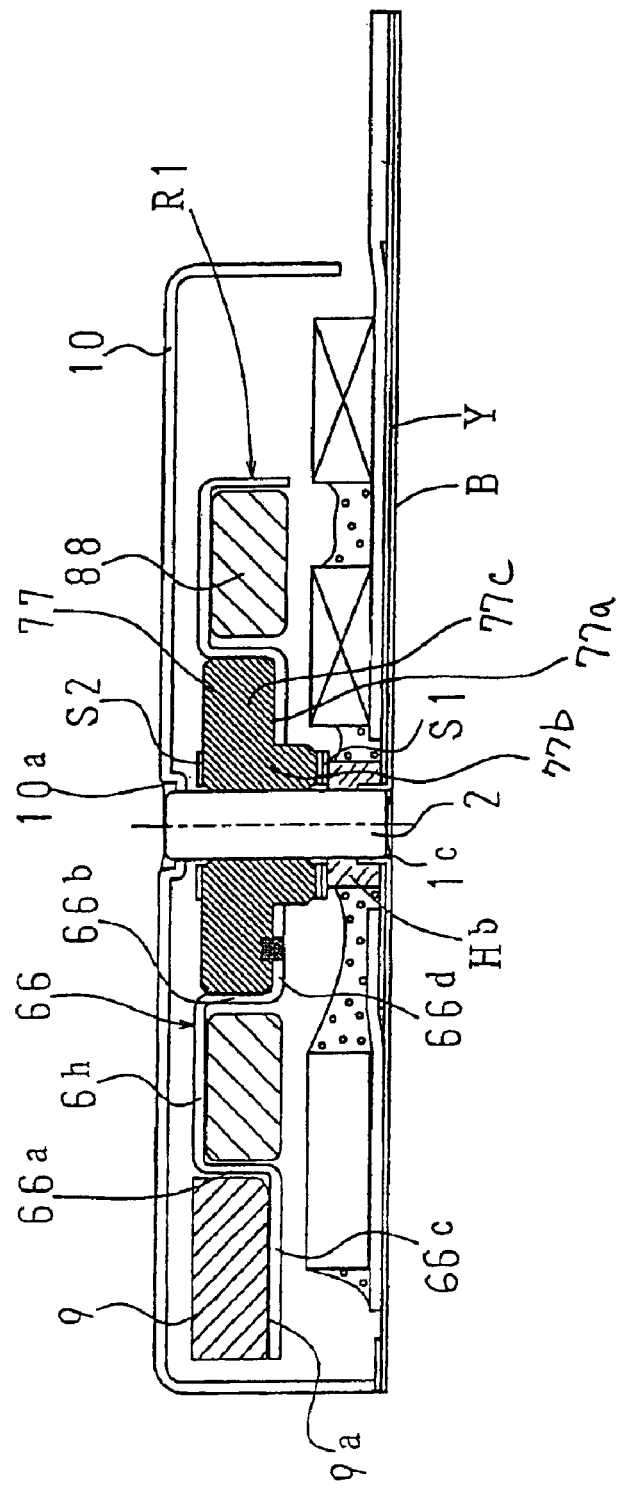
FIG. 6 is a longitudinal sectional view of an axial-air-gap brushless vibration motor of a coreless slotless system and a fixed shaft type comprising the stator shown in FIG. 5 (Embodiment 4)
Figure 7:
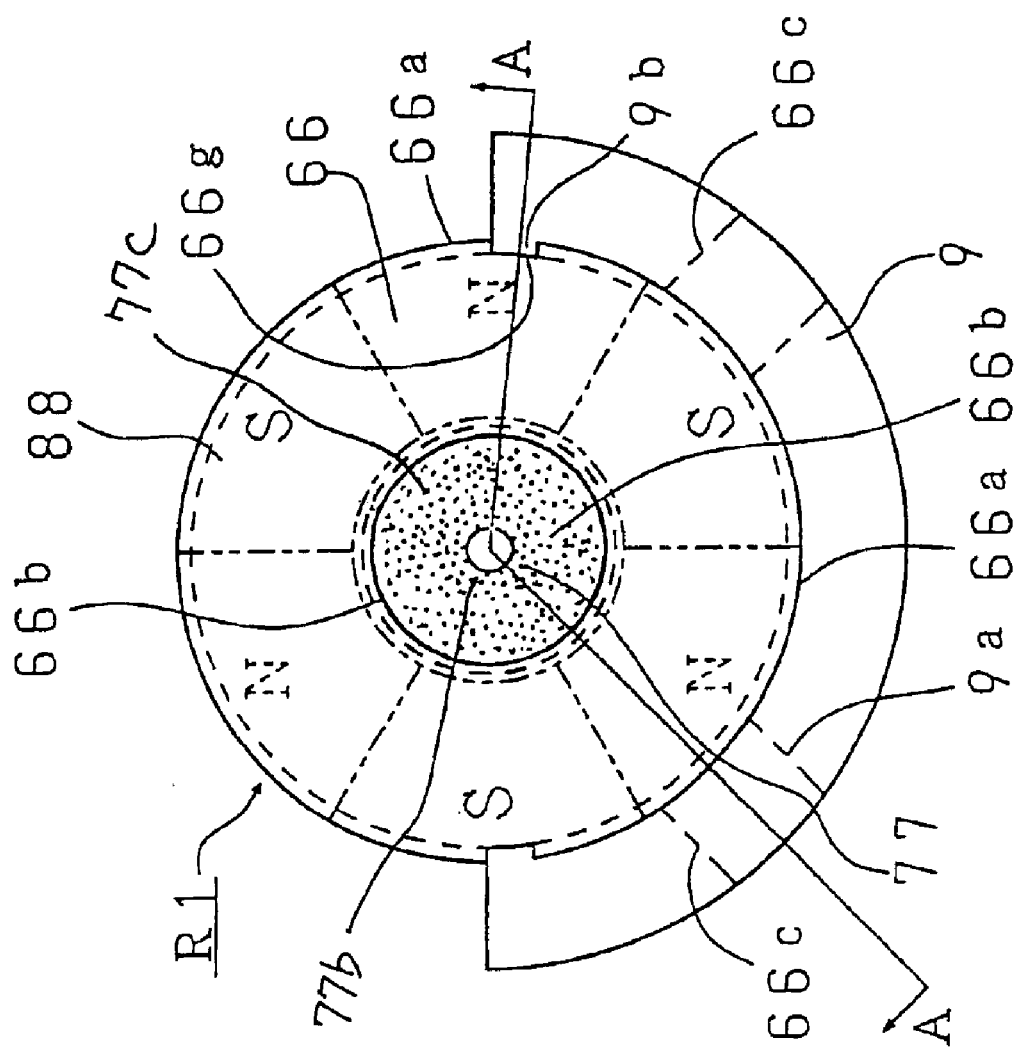
FIG. 7 is a plan view of the eccentric rotor shown in FIG. 6.

FIG. 6 is a longitudinal sectional view of an axial-air-gap brushless vibration motor of a coreless slotless configuration of a fixed shaft type equipped with the stator shown in FIG. 5. FIG. 7 is a plan view of the eccentric rotor shown in FIG. 6.

In an eccentric rotor R1 rotatably mounted on the shaft 2, an axial-air-gap resin magnet 88 in which a rare-earth element magnet powder is integrated with a polyamide resin is adhesively bonded to a rotor yoke 66 made from a thin magnetic sheet-like material. This thin rotor yoke 66 comprises a flat portion 6h receiving the magnetic field of the axial-air-gap resin magnet 88 and a axially extending portion 66a on the outer diameter side and a axially extending portion 66b on the inner diameter side, said axially extending portions being integral with the flat portion 6h. The axially extending portions are formed to have an almost cylindrical shape along the outer periphery and inner periphery of the disk-like flat portion 6h. In the present embodiment, the magnet 88 is in the form of a disk having six poles, and is adhesively bonded so as to be surrounded by the flat portion 6h and both axially extending portions 66a, 66b. Therefore, it can be held on the rotor R1 by a strong adhesive force.

In this thin rotor yoke 66, tongues 66c protrude radially in the normal line direction in two places from the axially extending portion 66a on the outer diameter side, as shown in FIG. 7, the tongues 66c being spaced by a prescribed angle and having steps with respect to the flat portion 6h.

The eccentric weight 9 is formed to have an arched shape along the outer periphery of the axially extending portion 66a on the outer diameter side, and recesses 9a are formed in the weight in positions corresponding to the tongues 66c. The eccentric weight 9 is, for example, adhesively bonded to the axially extending portion 66a on the outer diameter side, with the recesses 9a and the tongues 66c engaging on the axially extending portion 66a on the outer diameter side of the rotor yoke 66.

With such a configuration, because the tongues 66c are formed in the normal line direction in two places, movement of the eccentric weight 9 in the radial direction is controlled.

Protruding portions 9b are provided toward the center on both ends of the eccentric weight 9. When the eccentric weight 9 is attached to the rotor R1, those protrusions 9b are introduced into notches 66g provided in the rotor yoke 66.

On the inner diameter side of the rotor yoke 66, a flange 66d is formed inwardly in the radial direction from the axially extending portion 66b on the inner diameter side, this flange having a step with respect to the flat portion 6h.

A bearing 77, fixed to the rotor yoke 66, is composed of a tubular portion 77b sliding against the shaft 2 and an outer diameter portion 77c formed outwardly in the radial direction from the tubular portion 77b. A lower surface portion 77a which is in surface contact with the flange 66d is formed on the stator side of the outer diameter portion 77c. The bearing 77 is thus formed to have a flat shape. Furthermore, the tubular portion 77b is formed so as to extend in the axial direction from the outer diameter portion 77c. With such a configuration, the portion protruding from the outer diameter part can be used for positioning the flange 66d, and the effective length of bearing action can be increased.

Furthermore, with such a shape provided with the lower surface portion 77a, the bearing shape can be increased and handling thereof is facilitated.

The flange 66d and bearing 77 are fixed by spot welding at the lower surface portion 77a in order to fix the rotor yoke 66 and the sintered oil-impregnated bearing 77. Because the lower surface portion 77a is separated from the shaft 2, the effect of heat generated by the spot welding does not reach the portion sliding against the shaft 2.

The eccentric weight 9 is fixed by engaging the recesses 9a and tongues 66c and soldering or adhesively bonding to the rotor yoke 66. The magnet 88 is attached by adhesive bonding, or by spot welding or the like in the case of a rare-earth element sintered metal magnet. In the rotor R1 having such a configuration, reinforcement is increased by the axially extending portion 66a on the outer diameter side and the axially extending portion 66b on the inner diameter side. In particular, because the axially extending portion 66b on the inner diameter side is provided in a zone remote from the center and a small surface area is sufficient for the flat portion 6h, the strength of the rotor R1 can be effectively increased.

The eccentric rotor R1 with such a configuration is rotatably mounted on the shaft 2 in a state in which at least two stacked thrust washers S1 are mounted between the bearing 77 and the stator in order to reduce brake loss. The cover member 10 composed of a thin nonmagnetic stainless steel material is covered and the distal end of the shaft 2 is fit into the bar ring hole 10a formed in the center of the cover member 10. At this time, at least two thrust washers S2 are mounted between the bearing 77 and the cover member 10. Here, the bar ring hole 10a has a diameter less than that of the shaft 2, thereby preventing the distal end of the shaft 2 from protruding therefrom. The distal end portion is laser welded from the outside to the cover member 10 in order to prevent deformation, and opening of the cover portion 10 which is assembled by laser spot welding with the holding portion of the yoke bracket 1.

Therefore, because assembling is thus conducted by welding, sufficient strength can be obtained despite the fact that thin components are used. Furthermore, because movement in the radial direction is controlled by the notches 66g and protrusions 9b, impact resistance is improved despite the large mass of the weight.

Embodiment 5

Figure 8:
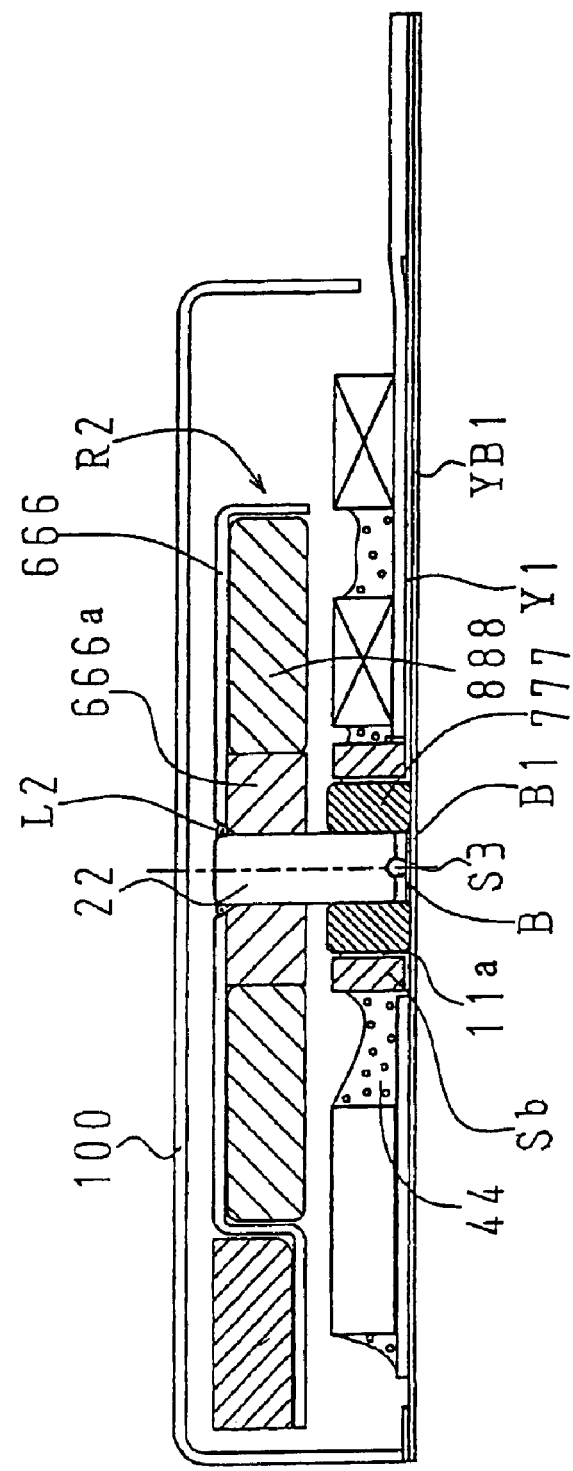
FIG. 8 is a longitudinal sectional view of an embodiment of the motor FIGS. 5 and 6 of a rotary shaft type (Embodiment 5).

FIG. 8 is a longitudinal sectional view of an axial-air-gap brushless vibration motor of a coreless slotless configuration and a rotary shaft type.

Components identical to those of the above-described embodiments or almost identical components having the same function as those of the above-described embodiments will be assigned hereinbelow with the same symbols and the explanation thereof will be sometimes omitted.

Thus, in the yoke bracket YB1, a shaft support portion 11a slightly larger in the center is strongly secured with a reinforcing sleeve Sb disposed on the outer periphery thereof, from which the yoke sheet Y1 protrudes upward in the form of a bar ring, and which accommodates therein a sintered oil-impregnated bearing 777.

On the other hand, the eccentric rotor R2 is inserted under pressure onto the shaft 22 with a diameter of 0.6 mm via a bushing 666a serving as a metal member on the inner diameter side of the rotor yoke 666. The rotor yoke 666, bushing 666a, and shaft 22 are fixed strongly by welding (L2). The outer diameter portion of the bushing 666a is bonded adhesively to the inner diameter portion of magnet 888. The base end of the shaft 22 is pivotally supported via a thrust washer S3 on the bracket sheet B1 of the yoke bracket YB1 by a ball bearing B with a size of about 0.3 mm.

Here, instead of using the ball bearing B, the base end (second end portion) of the shaft may be rounded.

Obviously, no bar ring hole for the shaft 22 is provided, as shown in the figure, in the cover member 100.

The present invention is not limited to mobile communication devices and can be also used as means for transferring information by vibrations to visually and audibly impaired people.

Various other modifications may be made in the invention without departing from the technological essence and spirit thereof. Therefore, the above-described embodiments of the invention merely serve to illustrate the invention and should not be construed as limiting. The technological scope of the invention is defined in the claims and is not restricted by the detailed description of the invention.

Embodiment 6

Figure 9:
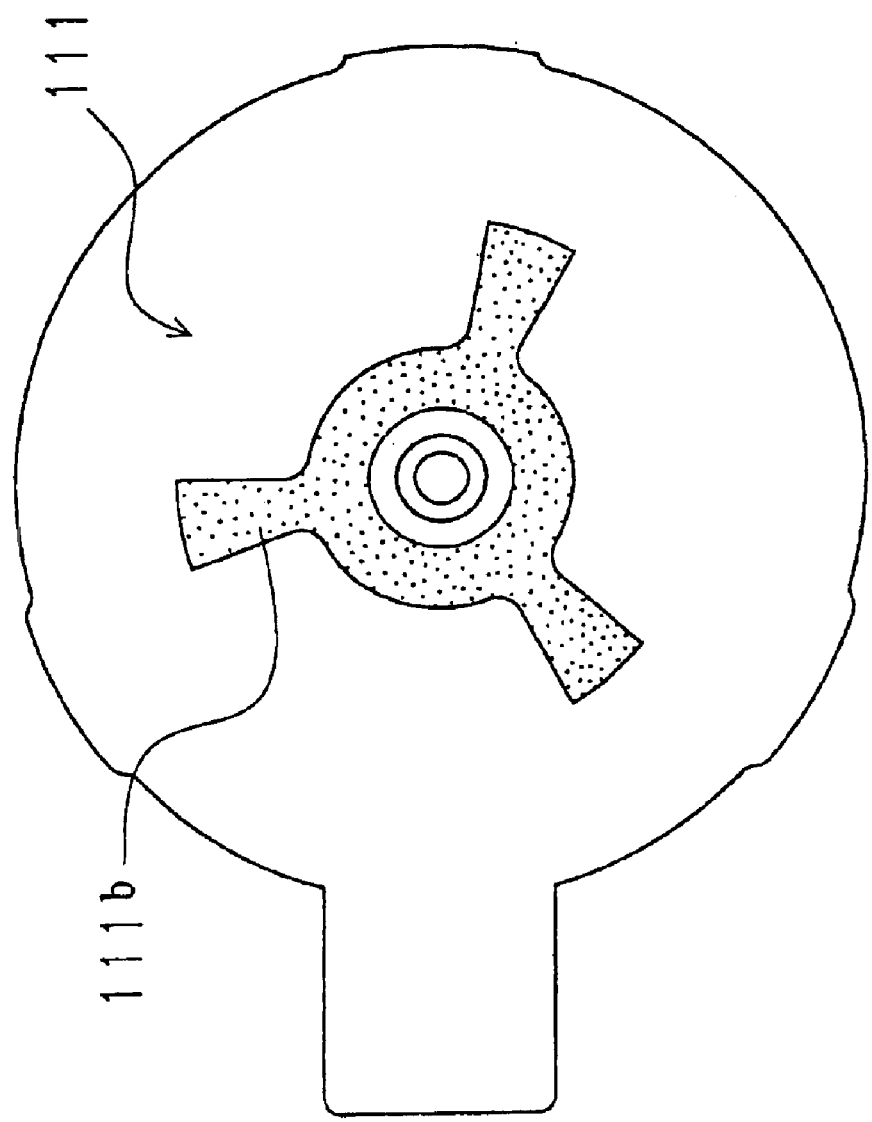
FIG. 9 is a plan view of a second variation of the stator member (Embodiment 6).

FIG. 9 shows a second variation on a stator member. This is a variation on the embodiment shown in FIGS. 3 and 4. Here, on a part of the stator, a magnetic portion configured as detent torque generation portions 111b is formed by printing onto the bracket plate 111, for example, by transferring a magnetic particle coating.

This enables the detent torque generation portions 111b to be extremely thin; therefore, the nonmagnetic bracket plate can be that much thicker—that is, up to 0.1 mm, allowing for sufficient strength.

Embodiment 7

In the embodiment described above, a detent torque generation portion was formed by printing a magnetic particle coating onto the bracket 1; in an alternative configuration, prescribed masking is performed and a magnetic plating is formed with, for example, ferrite.

Figure 10:
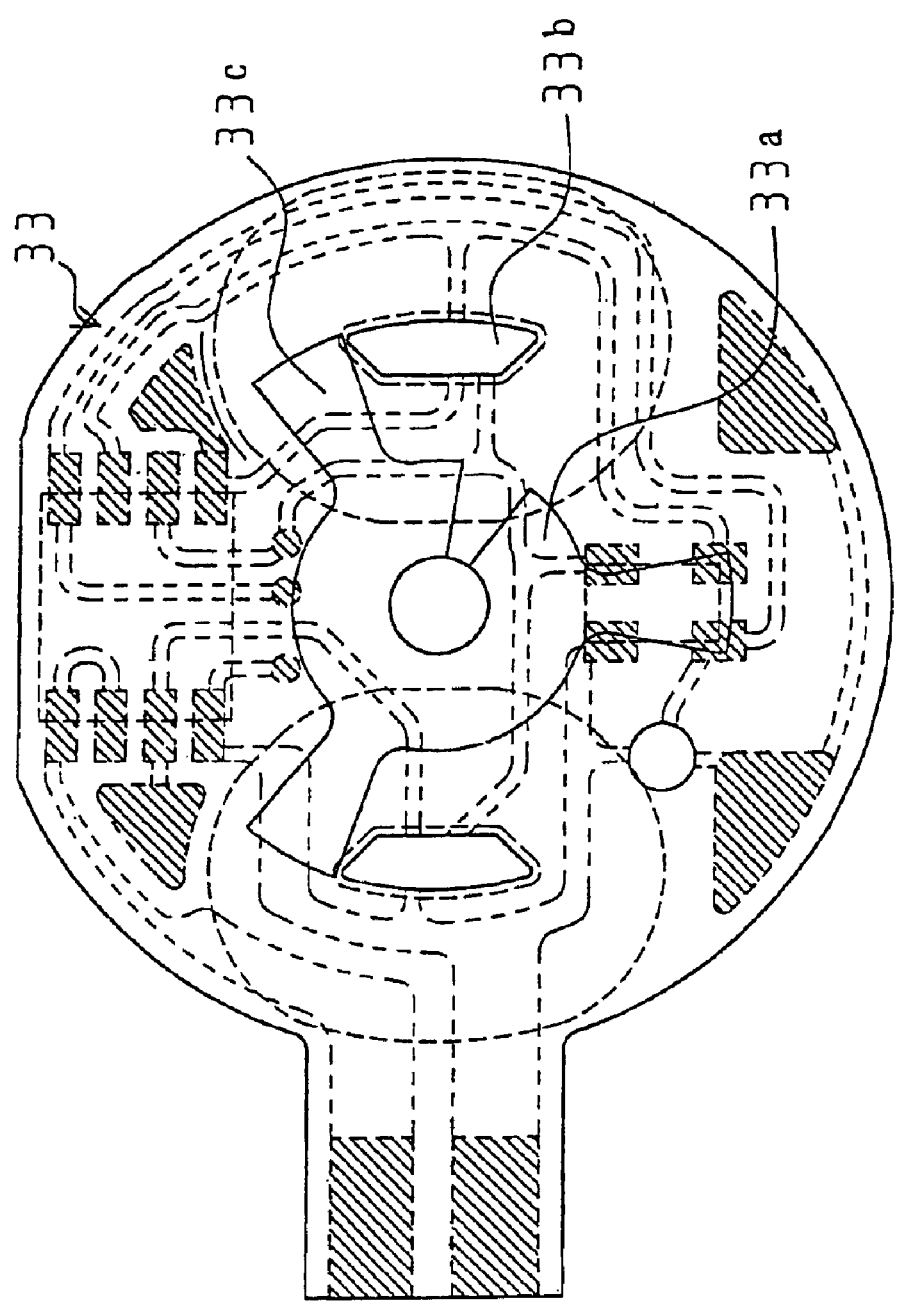
FIG. 10 is a plan view of a third variation of the stator member (Embodiment 7).

Further, as shown in FIG. 10, the detent torque generation portions 33c may be formed by transferring magnetic plating or a magnetic particle coating on the bottom surface of the stator base 33. In such cases, too, the detent torque generation portion will be an extremely thin portion of the stator member.

What is claimed is:

1. An axial-air-gap brushless vibration motor, comprising:
   a stator having air-core armature coils and a shaft disposed thereon efining an axis of the motor;
   an eccentric rotor having a magnet attached thereto and rotatably supported by the shaft on the stator; and
   said eccentric rotor including:
      a rotor yoke formed of a thin magnetic metal sheet having a first side and a second side and comprising a flat annular portion, a first axially extending portion on an outer periphery of the flat annular portion, a flange on an inner diameter side of the flat annular portion, and a second axially extending portion connected at a first axial end thereof to an inner periphery of said flat annular portion and at a second axial end thereof to said flange to form a stepped flange structure;

a disk ring-shaped axial-air-gap magnet having a plurality of magnetized magnetic poles attached to the rotor yoke on the first side on said flat annular portion and an inner periphery of said first axially extending portion;

an arched eccentric weight attached to an outer periphery of said first axially extending portion;

a cylindrical bearing attached to said rotor yoke on the second side on said flange radially inward of said second axially extending portion; and said eccentric rotor being rotatably supported on the shaft of the stator via said cylindrical bearing attached to said flange portion.

2. The axial-air-gap brushless vibration motor, as described in claim 1, further comprising:

radial tongues connected to said annular flat portion by said first axially extending portion and extending radially outward from an outer periphery of said first axially extending portion;

said eccentric weight defining recesses corresponding to the radial tongues; and said eccentric weight having said radial tongues disposed in and attached the recesses and thereby being attached to the outer periphery of said first axially extending portion.

3. The axial-air-gap brushless vibration motor, as described in claim 2, wherein said cylindrical bearing is a sintered oil-impregnated bearing and said eccentric rotor is supported to rotate about the shaft.

4. The axial-air-gap brushless vibration motor, as described in claim 3, wherein said first and second axially extending portions extend from said flat annular portion in the same axial direction.

5. The axial-air-gap brushless vibration motor, as described in claim 4, wherein said first and second axially extending portions extend from said flat annular portion parallel to the axis of the shaft.

6. The axial-air-gap brushless vibration motor, as described in claim 2, wherein said first and second axially extending portions extend from said flat annular portion in the same axial direction.

7. The axial-air-gap brushless vibration motor, as described in claim 6, wherein said first and second axially extending portions extend from said flat annular portion parallel to the axis of the shaft.

8. The axial-air-gap brushless vibration motor, as described in claim 1, wherein said cylindrical bearing is a sintered oil-impregnated bearing and said eccentric rotor is supported to rotate about the shaft.

9. The axial-air-gap brushless vibration motor, as described in claim 8, wherein said first and second axially extending portions extend from said flat annular portion in the same axial direction.

10. The axial-air-gap brushless vibration motor, as described in claim 9, wherein said first and second axially extending portions extend from said flat annular portion parallel to the axis of the shaft.

11. The axial-air-gap brushless vibration motor, as described in claim 1, wherein said first and second axially extending portions extend from said flat annular portion in the same axial direction.

12. The axial-air-gap brushless vibration motor, as described in claim 11, wherein said first and second axially extending portions extend from said flat annular portion parallel to the axis of the shaft.

13. The axial-air-gap brushless vibration motor, as described in claim 1, wherein said first and second axially extending portions extend from said flat annular portion parallel to the axis of the shaft.

14. An axial-air-gap brushless vibration motor in which an eccentric rotor having a magnet attached thereto is rotatably supported by a shaft on a stator having air-core armature coils disposed in the same plane, wherein:

in said eccentric rotor, the rotor yoke formed of a thin magnetic metal sheet comprises a flat portion, a hanging portion on the outer diameter side, and a flange on the inner diameter side of the flat portion;

a disk ring-shaped axial-air-gap magnet having a plurality of magnetized magnetic poles is attached to the rotor yoke so as to surround said flat portion and said hanging portion on the outer diameter side;

an arched eccentric weight is fixed on the outer periphery of said hanging portion on the outer diameter side;

said eccentric rotor is rotatably supported on the stator via said flange portion;

a plurality of tongues are formed at said hanging portion on the outer diameter side so as to protrude further outwardly and radially;

recesses corresponding to those tongues are provided in said eccentric weight; and said eccentric weight is fixed to said tongues and axially extending portion on the outer diameter side.

15. An axial-air-gap brushless vibration motor in which an eccentric rotor having a magnet attached thereto is rotatable supported by a shaft on a stator having air-core armature coils disposed in the same plane, wherein;

in said eccentric rotor, the rotor yoke formed of a thin magnetic metal sheet comprises a flat portion, a hanging portion on the outer diameter side, and a flange on the inner diameter side of the flat portion;

a disk ring-shaped axial-air-gap magnet having a plurality of magnetized magnetic poles is attached to the rotor yoke so as to surround said flat portion and said hanging portion on the outer diameter side;

an arched eccentric weight is fixed on the outer periphery of said hanging portion on the outer diameter side;

said eccentric rotor is rotatably supported on the stator via said flange portion;

projections protruding inwardly and radially are formed at both end portions of said eccentric weight; and notches capable of accommodating those projections are formed in said hanging portion on the outer diameter side.

* * * * *